March 22, 1966  A. Q. HUDGINS  3,241,790
WIRE CONTAINER FOR HAY BALER
Filed Dec. 23, 1963  2 Sheets-Sheet 1
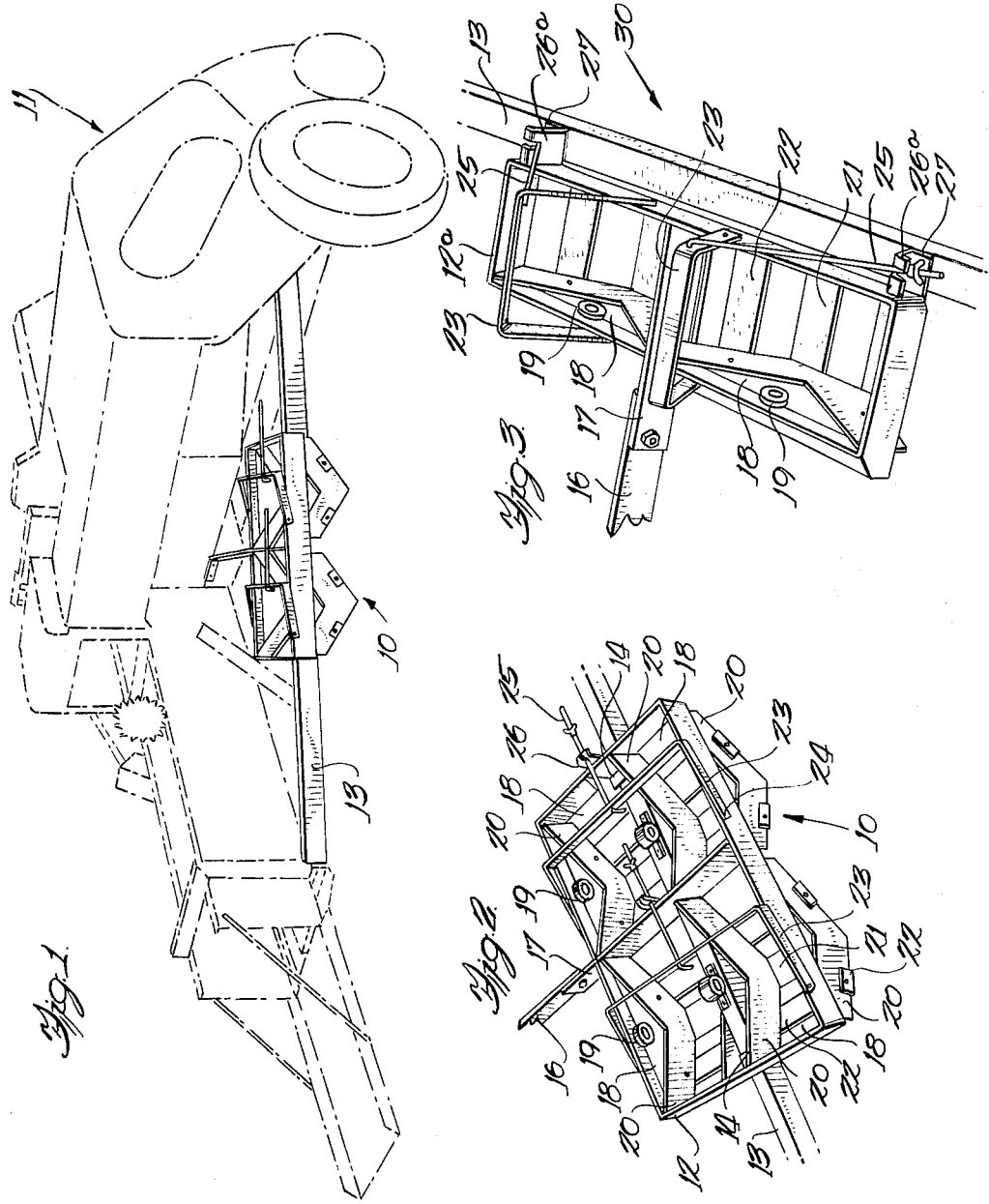

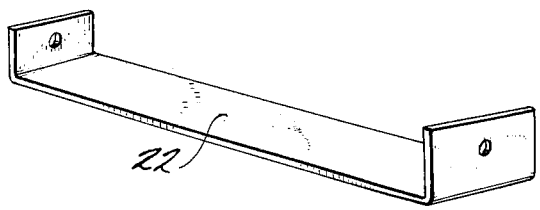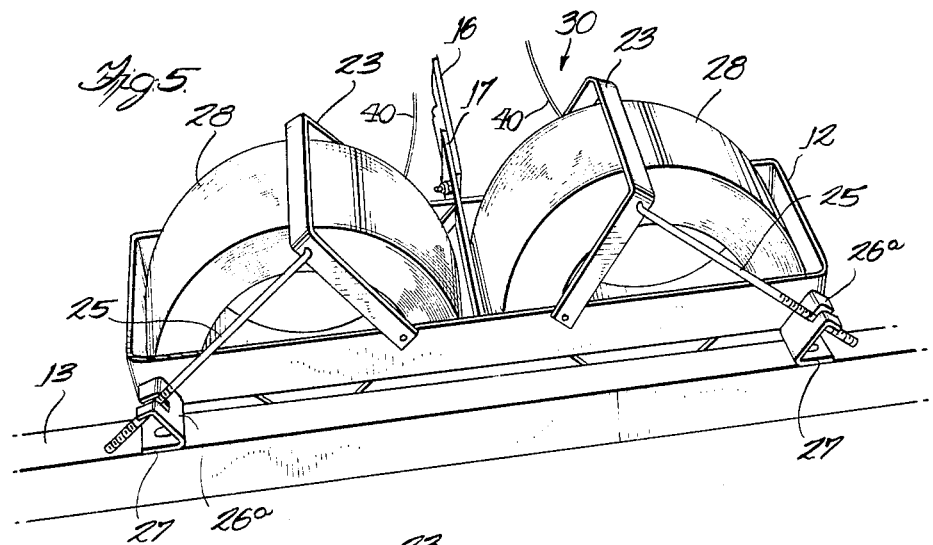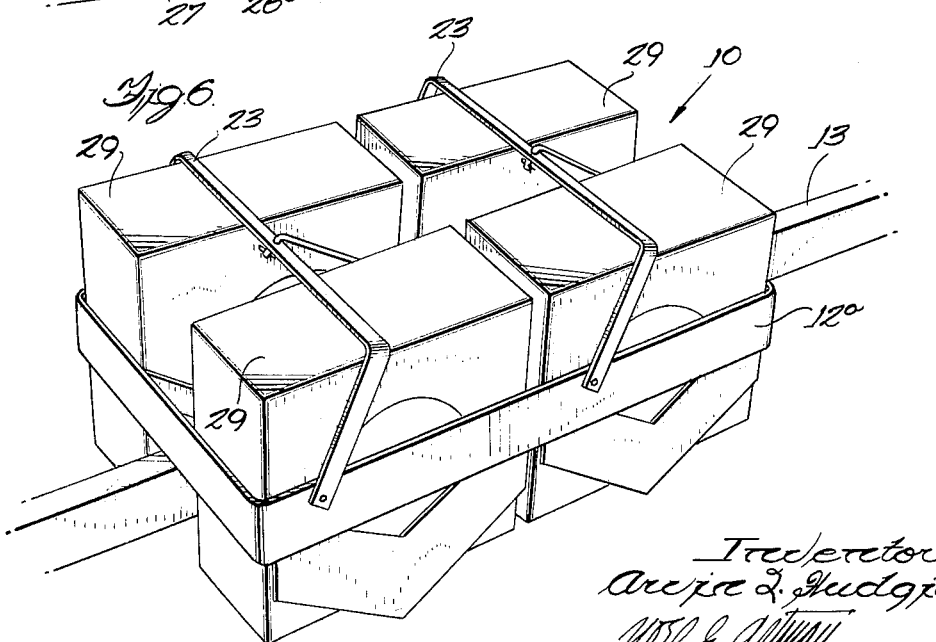

United States Patent Office 3,241,790
Patented Mar. 22, 1966

3,241,790
WIRE CONTAINER FOR HAY BALER
Arvin Q. Hudgins, Huntsville, Ala., assignor to International Harvester Company, Chicago, Ill., a corporation of New Jersey
Filed Dec. 23, 1963, Ser. No. 332,647
1 Claim. (Cl. 242—129)

This invention is a new and useful improvement of the wire tying system of a hay baler. More particularly, the present invention comprises a wire container for a hay baler that can be mounted thereon with the minimum of special bracing and, once in place, can be used to carry either a bare coil of baling wire or a carton of baling wire.

The object of the present invention is efficiency in the manufacture, installation, and use of the wire containers of a hay baler. For example, the wire container comprising the present invention is made from a few, simple parts, which are readily fabricated, repaired, replaced, or adjusted. Also, the wire container herein described and claimed can be installed directly on a hay baler without the use of special adapters. In addition, the present wire container can be quickly adjusted to carry either a bare coil of wire or a cardboard carton of wire.

Two embodiments of the improved wire container are shown in the drawings, where:

FIG. 1 is a perspective view which shows the general location of the novel wire container on the rear of a hay baler, a four-coil wire container being used;

FIG. 2 is a perspective view which shows the structural details of the four-coil type wire container of FIG. 1;

FIG. 3 is a perspective view which shows the structural details of a two-coil type wire container;

FIG. 4 is a perspective view which shows the removable bottom plate used with both the two and four-coil type wire containers;

FIG. 5 is a perspective view which shows the two-coil container of FIG. 3 with a bare coil of wire in each wire compartment; and FIG. 6 is a perspective view which shows the four-coil container in FIG. 2 with a carton of wire in each wire compartment.

Prior art wire containers, such as that shown in U.S. Patent No. 2,800,996 to Bornzin et al., require a special mounting fixture in order to be attached to a hay baler and are also suited for use only with bare metal coils of wire. The wire container herein disclosed, is on the other hand, attached directly to a hay baler without the use of special fittings, as it is bolted to an existing cross brace of the baler. In addition, the present wire container accommodates not only the old, bare coils of wire, but also the newer, self-dispensing cartons of baling wire. The cardboard carton helps the coil of wire to hold its shape, saves storage space, and facilitates dispensing of the wire.

As shown in FIG. 1, the novel wire container 10 of the present application is located on the rear of a conventional hay baler 11. The hay baler per se forms no part of the present invention; therefore, the reader is referred to U.S. Patents 2,450,082, 2,897,747, 2,909,- 989, and 2,923,230 for background information about hay baling machinery.

The wire container 10 of FIG. 1 is a four-coil type container, the details of which are shown in FIG. 2. Container 10 comprises a rectangular-shaped base 12 supported on existing cross-brace 13 of baler 11 at two points by means of arms 14, which are bolted to cross-brace 13. A stabilizer bar 16 extending from the baler is bolted to partition 17 of base 12 to provide lateral support therefor. The base 12 is divided into four coil compartments 18 by brace 13, running lengthwise through base 12, and by partition 17, extending laterally across base 12. Wire guides 19 are mounted as shown, either on base 12 or cross-brace 13, along the imaginary horizontal axis of a coil of wire, to direct the movement of the wire as it uncoils.

Each coil compartment 18 comprises a pair of side plates 20, a fixed bottom plate 21, and two detachable bottom plates 22. Side plates 20 are welded either to base 12 or partition 17 and depend therefrom. The lower edge or each side plate 20 is V-shaped to orient the detachable bottom plates 22 so that they extend up and support the sides of the coil of wire. Fixed bottom plate 21 is horizontal, to provide support for the bottom of the coil or carton of wire, and is welded at each end to one of the side plates 20. One bottom plate 22 (FIG. 4) is located to each side of the fixed bottom plate 21 and is detachably bolted to said plates 20.

A coil retainer bar 23 extending laterally across two coil compartments 18 is pivotally attached to base 12 by pins 24, so that it may be swung over the compartments into coil-retaining position. Bar 23 is locked into coil-retaining position by locking rod 25, which is articulated at one end to retainer bar 23 and held in a slot in locking tab 26 at its other end. At the latter end rod 25 is threaded and equipped with a nut, which holds rod 25 against tab 26.

A two-coil type wire container 30 embodying the concept of the present invention is shown in FIG. 3. The two-coil container 30 differs from the four-coil container 10 primarily in the manner in which it is attached to the hay baler. As shown in FIG. 3, base 12A is located on the inboard side of brace 13. Brackets 27 project from the outboard side of base 12A at each end thereof to rest on cross-brace 13. The brackets 27 are in turn bolted to cross-brace 13. Partition 17, which divides base 12 into two coil compartments and extends towards the baler 11, is bolted for support to stabilizer bar 16. In all other respects, the two-coil type wire container is substantially the same as the four-coil type container, described above, to which description the reader is referred for details of fixed bottom plate 21, detachable bottom plates 22, coil retainer bar 23, and wire guide 19. Locking tab 26A is, however, here associated with bracket 27 rather than being free standing; and locking rod 25 is joined to the side of bar 23 rather than at its mid-point.

The operation of the adjustable wire container disclosed hereinabove is as follows: When used to carry bare coils of wire 28 (FIG. 5) each coil compartment has two detachable bottom plates 22 (FIG. 4) attached to its side plates 20, as shown in either FIG. 2 or FIG. 3. The three bottom plates bear tangentially against the surface of the coil to support it with its axis positioned horizontally. When the container is to be used to carry cartons of wire 29 (FIG. 6), the sloping bottom plates 22 are removed. Fixed bottom plate 21 then provides a horizontal surface suitable for supporting a carton of wire. After either the coil or carton of wire is placed in a compartment, coil retainer bar 23 is swung over the compartment, rod 25 is inserted in the slot of tab 26 or 26A and the nut on rod 25 is drawn up tightly against locking tab 26 or 26A to secure the wire coil in place.

The leading end of the outboard coil of wire is threaded through the wire guides 19 and joined to the tail end of the inboard coil of wire. The leading end 40 of the inboard coil of wire is then threaded through the inboard wire guide 19 and extended to the baler needle.

According to the foregoing description, a new and improved wire container for a hay baler has been presented. It is not intended, however, to limit the present invention to the exact form shown but to embrace, as well, all obvious variations that fall within the spirit and scope of the attached claim.

I claim:

For use on a hay baler or similar machine, a container for carrying a coil of baling wire with its axis oriented horizontally, comprising: a base including two sides for supporting a coil of wire along its sides, means on said base for attachment thereof to the exterior of said baler, three bottom plates for supporting said coil of wire along the underside thereof, said two base sides having three positions for attachment thereto of said bottom plates, the first of said positions being to one side of said coil axis, the second of said positions being to the other side of said coil axis, the third of said positions being intermediate said first and said second positions and below said coil axis, one of said bottom plates being attached to said base sides at said intermediate position, the remaining two of said bottom plates being temporarily attached to said base sides at each of the respective remaining two of said three positions, whereby said remaining two of said bottom plates may be removed to accommodate a rectilinear carton of wire in said container, means for retaining a coil of wire in said container attached to said base, said last-named means comprising a coil retainer bar pivotally attached to said base, said coil retainer bar being pivotal from a first, coil-retaining position in which it is adapted to prevent egress of a coil of wire from said container to a second, coil-loading position in which it is adapted to permit passage of a coil of wire into said container, and means on said coil retainer bar for locking said coil retainer bar in said coil-retaining position.

References Cited by the Examiner

UNITED STATES PATENTS

| | | | |
|---|---|---|---|
| 2,458,318 | 1/1949 | Tuft | 242—80 |
| 2,477,059 | 7/1949 | Hill | 242—129 |
| 2,989,172 | 6/1961 | Stoll | 206—52 |
| 3,028,117 | 4/1962 | Shepley | 242—129 |
| 3,054,506 | 9/1962 | Erb | 242—129 |
| 3,125,312 | 3/1964 | McDuffie | 242—129 |

MERVIN STEIN, *Primary Examiner.*

WALTER A. SCHEEL, *Examiner.*